(12) United States Patent
Vaknin et al.

(10) Patent No.: US 12,514,659 B2
(45) Date of Patent: Jan. 6, 2026

(54) ONE-SIDED ROBOTIC SURGICAL PROCEDURE

(71) Applicant: ForSight Robotics Ltd., Yokneam Illit (IL)

(72) Inventors: Oshri Vaknin, Tel Aviv (IL); Daniel Glozman, Kfar Yona (IL)

(73) Assignee: ForSight Robotics Ltd., Yokneam Illit (IL)

( * ) Notice: Subject to any disclaimer, the term of this patent is extended or adjusted under 35 U.S.C. 154(b) by 210 days.

(21) Appl. No.: 18/298,891

(22) Filed: Apr. 11, 2023

(65) Prior Publication Data
US 2023/0240773 A1 Aug. 3, 2023

Related U.S. Application Data

(63) Continuation of application No. PCT/IB2022/059386, filed on Oct. 2, 2022.
(Continued)

(51) Int. Cl.
*A61B 34/30* (2016.01)
*A61B 34/00* (2016.01)
*A61B 90/00* (2016.01)

(52) U.S. Cl.
CPC .............. *A61B 34/30* (2016.02); *A61B 34/74* (2016.02); *A61B 90/361* (2016.02); *A61B 2034/742* (2016.02); *A61B 2090/3618* (2016.02)

(58) Field of Classification Search
CPC ......... G06T 7/33; G06T 1/0007; A61B 90/37; A61B 90/361; A61B 34/20; A61B 34/30;
(Continued)

(56) References Cited

U.S. PATENT DOCUMENTS 5,269,787 A 12/1993 Cozean et al.
5,410,638 A 4/1995 Colgate et al.
(Continued)

FOREIGN PATENT DOCUMENTS

CN 109602498 A 4/2019
CN 109602499 A 4/2019
(Continued)

OTHER PUBLICATIONS

Communication Pursuant to Article 94(3) EPC for European Application No. 22727496.6 mailed Jun. 23, 2023.
(Continued)

*Primary Examiner* — Dalena Tran
(74) *Attorney, Agent, or Firm* — Ballard Spahr LLP (57) ABSTRACT

Apparatus and methods are described for performing a procedure on a portion of a first side of a body of a patient using one or more tools. An imaging device images the portion of the first side of the patient's body. A display displays a mirror image of the portion of the first side of the patient's body to an operator. One or more control components are be operated by the operator. One or more robotic units hold the one or more tools, each of the one or more robotic units corresponding to a respective control component and mirroring a position of the corresponding control component. A computer processor processes inputs into the each of the control components such as to generate mirrored outputs at the corresponding robotic unit. Other applications are also described.

17 Claims, 2 Drawing Sheets

Related U.S. Application Data (60) Provisional application No. 63/256,587, filed on Oct. 17, 2021.

(58) Field of Classification Search
CPC .............. A61B 34/74; A61B 2090/365; A61B 2090/3618; A61B 2034/742
See application file for complete search history.

(56) References Cited

U.S. PATENT DOCUMENTS

| | | | |
|---|---|---|---|
| 5,828,197 | A | 10/1998 | Martin et al. |
| 7,896,653 | B2 | 3/2011 | Nylen |
| 8,396,598 | B2 | 3/2013 | Sutherland et al. |
| 8,509,949 | B2 | 8/2013 | Bordyn et al. |
| 8,512,353 | B2 | 8/2013 | Rosielle |
| 8,596,789 | B2 | 12/2013 | Takii |
| 8,690,212 | B2 | 4/2014 | Lee et al. |
| 9,039,681 | B2 | 5/2015 | Wang et al. |
| 9,283,043 | B2 | 3/2016 | Tsao et al. |
| 9,358,078 | B2 * | 6/2016 | Lim ................ H04N 13/239 |
| 9,383,832 | B1 | 7/2016 | Lammertse |
| 9,504,604 | B2 | 11/2016 | Alvarez |
| 9,655,681 | B2 | 5/2017 | Meenink |
| 9,658,605 | B2 | 5/2017 | Lee et al. |
| 9,788,910 | B2 | 10/2017 | Schuh |
| 9,835,849 | B2 | 12/2017 | Schneider et al. |
| 9,918,066 | B2 | 3/2018 | Schneider et al. |
| 9,943,708 | B2 | 4/2018 | Roberts et al. |
| 9,967,475 | B2 | 5/2018 | Schneider et al. |
| 9,993,313 | B2 | 6/2018 | Schuh et al. |
| 10,073,515 | B2 | 9/2018 | Awdeh |
| 10,149,720 | B2 | 12/2018 | Romo |
| 10,345,582 | B2 | 7/2019 | Schneider et al. |
| 10,433,916 | B2 | 10/2019 | Schneider et al. |
| 10,507,067 | B2 | 12/2019 | Glozman et al. |
| 10,582,975 | B2 | 3/2020 | Simi et al. |
| 10,631,949 | B2 | 4/2020 | Schuh et al. |
| 10,722,312 | B2 | 7/2020 | Marshall et al. |
| 10,744,035 | B2 | 8/2020 | Alvarez et al. |
| 10,779,727 | B2 | 9/2020 | Zeitouny et al. |
| 10,786,323 | B2 | 9/2020 | Ang et al. |
| 10,806,523 | B2 | 10/2020 | Roth et al. |
| 10,821,046 | B2 | 11/2020 | Hares et al. |
| 10,864,051 | B2 | 12/2020 | Simi et al. |
| 10,888,384 | B2 | 1/2021 | Rosielle et al. |
| 10,895,742 | B2 | 1/2021 | Schneider et al. |
| 10,895,750 | B2 | 1/2021 | Schneider et al. |
| 10,932,865 | B2 | 3/2021 | Zhang et al. |
| 11,013,565 | B2 | 5/2021 | Beelen et al. |
| 11,039,891 | B2 | 6/2021 | Shochat et al. |
| 11,058,574 | B2 | 7/2021 | Michels et al. |
| 11,083,488 | B2 | 8/2021 | Galili et al. |
| 11,090,747 | B2 | 8/2021 | Simi et al. |
| 11,096,748 | B2 | 8/2021 | Simi et al. |
| 11,103,319 | B2 | 8/2021 | Simi et al. |
| 11,129,686 | B2 | 9/2021 | Chaplin et al. |
| 11,141,233 | B2 | 10/2021 | Simi et al. |
| 11,154,371 | B2 | 10/2021 | Jackson et al. |
| 11,202,684 | B2 | 12/2021 | Arnold et al. |
| 11,389,249 | B2 | 7/2022 | Schneider et al. |
| 11,471,169 | B1 | 10/2022 | Nikou et al. |
| 11,484,363 | B2 | 11/2022 | Schneider et al. |
| 11,523,839 | B2 * | 12/2022 | Wellman ................ A61B 34/30 |
| 11,551,582 | B2 | 1/2023 | Slabber et al. |
| 11,800,966 | B2 * | 10/2023 | Kihara .................. G16H 20/40 |
| 11,957,421 | B2 * | 4/2024 | Shelton, IV ........... A61B 1/043 |
| 2001/0020200 | A1 | 9/2001 | Das et al. |
| 2003/0125716 | A1 | 7/2003 | Wang et al. |
| 2004/0034282 | A1 | 2/2004 | Quaid |
| 2004/0092982 | A1 | 5/2004 | Sheffer |
| 2006/0142897 | A1 | 6/2006 | Green |
| 2007/0191862 | A1 | 8/2007 | Ellis |
| 2007/0299427 | A1 | 12/2007 | Yeung et al. |
| 2010/0137880 | A1 | 6/2010 | Nahum |
| 2010/0234857 | A1 | 9/2010 | Itkowitz |
| 2010/0331858 | A1 | 12/2010 | Chang et al. |
| 2011/0054315 | A1 | 3/2011 | Roberts et al. |
| 2011/0306986 | A1 | 12/2011 | Lee et al. |
| 2012/0071863 | A1 | 3/2012 | Lee et al. |
| 2012/0162076 | A1 | 6/2012 | Obermeyer et al. |
| 2013/0035537 | A1 | 2/2013 | Wallace et al. |
| 2013/0131867 | A1 | 5/2013 | Olds et al. |
| 2014/0114480 | A1 | 4/2014 | Greer et al. |
| 2014/0142591 | A1 | 5/2014 | Alvarez et al. |
| 2014/0166023 | A1 | 6/2014 | Kishi |
| 2014/0194699 | A1 | 7/2014 | Roh et al. |
| 2014/0194859 | A1 | 7/2014 | Ianchulev |
| 2014/0364870 | A1 | 12/2014 | Alvarez et al. |
| 2015/0119638 | A1 | 4/2015 | Yu |
| 2015/0202009 | A1 | 7/2015 | Nussbaumer |
| 2015/0257841 | A1 | 9/2015 | Dachs |
| 2015/0265807 | A1 | 9/2015 | Park et al. |
| 2015/0335480 | A1 | 11/2015 | Alvarez et al. |
| 2016/0063898 | A1 | 3/2016 | Bernal |
| 2016/0157941 | A1 | 6/2016 | Anvari |
| 2016/0270867 | A1 | 9/2016 | Scholan |
| 2016/0346060 | A1 | 12/2016 | Nawrat et al. |
| 2017/0042730 | A1 | 2/2017 | He |
| 2017/0252208 | A1 | 9/2017 | Meenink |
| 2018/0042682 | A1 | 2/2018 | Iceman |
| 2018/0104013 | A1 | 4/2018 | Hamamoto et al. |
| 2018/0147017 | A1 | 5/2018 | Marshall et al. |
| 2018/0200008 | A1 | 7/2018 | Cooper |
| 2018/0296285 | A1 | 10/2018 | Simi et al. |
| 2018/0303567 | A1 | 10/2018 | Simi et al. |
| 2018/0319023 | A1 | 11/2018 | Robinson |
| 2018/0360654 | A1 | 12/2018 | Michels et al. |
| 2019/0000706 | A1 | 1/2019 | Hares et al. |
| 2019/0015167 | A1 | 1/2019 | Draelos |
| 2019/0038369 | A1 | 2/2019 | Naus et al. |
| 2019/0099232 | A1 | 4/2019 | Soto |
| 2019/0125582 | A1 | 5/2019 | Marchini |
| 2019/0223977 | A1 | 7/2019 | Galili et al. |
| 2019/0314529 | A1 | 10/2019 | Mordaunt |
| 2019/0336222 | A1 | 11/2019 | Schneider et al. |
| 2019/0343594 | A1 | 11/2019 | Garcia Kilroy et al. |
| 2020/0008890 | A1 | 1/2020 | Seneci et al. |
| 2020/0015917 | A1 | 1/2020 | Cavalier et al. |
| 2020/0046394 | A1 | 2/2020 | Cau |
| 2020/0146885 | A1 | 5/2020 | Ootsuki |
| 2020/0170740 | A1 | 6/2020 | Galili et al. |
| 2020/0214777 | A1 | 7/2020 | Itkowitz |
| 2020/0222124 | A1 | 7/2020 | Savall et al. |
| 2020/0237467 | A1 | 7/2020 | Savall et al. |
| 2020/0261169 | A1 | 8/2020 | Miller et al. |
| 2020/0323427 | A1 | 10/2020 | Gharib et al. |
| 2020/0330174 | A1 | 10/2020 | Bertram |
| 2020/0346046 | A1 | 11/2020 | Cannata et al. |
| 2020/0360092 | A1 | 11/2020 | Deng et al. |
| 2020/0360095 | A1 | 11/2020 | Grant et al. |
| 2020/0397520 | A1 | 12/2020 | Penny et al. |
| 2020/0397531 | A1 | 12/2020 | Schrader et al. |
| 2020/0405403 | A1 | 12/2020 | Shelton et al. |
| 2021/0000491 | A1 | 1/2021 | Chappuis |
| 2021/0000558 | A1 | 1/2021 | Penny et al. |
| 2021/0015573 | A1 | 1/2021 | Tsao et al. |
| 2021/0015574 | A1 | 1/2021 | Atay et al. |
| 2021/0030499 | A1 | 2/2021 | Peine |
| 2021/0045828 | A1 | 2/2021 | Mcbrien et al. |
| 2021/0059776 | A1 | 3/2021 | Simi et al. |
| 2021/0068911 | A1 | 3/2021 | Walker et al. |
| 2021/0095475 | A1 | 4/2021 | Ren |
| 2021/0106393 | A1 | 4/2021 | Simi et al. |
| 2021/0121256 | A1 | 4/2021 | Simi et al. |
| 2021/0121259 | A1 | 4/2021 | Simi et al. |
| 2021/0121264 | A1 | 4/2021 | Tadano et al. |
| 2021/0132701 | A1 | 5/2021 | He |
| 2021/0137618 | A1 | 5/2021 | Simi et al. |
| 2021/0142696 | A1 | 5/2021 | Omata et al. |
| 2021/0145530 | A1 | 5/2021 | Martin |
| 2021/0186636 | A1 | 6/2021 | Gunn et al. |
| 2021/0196417 | A1 | 7/2021 | Simi et al. |
| 2021/0205039 | A1 | 7/2021 | Simi et al. |
| 2021/0228292 | A1 | 7/2021 | Tsao et al. |

(56) References Cited

U.S. PATENT DOCUMENTS

| | | |
|---|---|---|
| 2021/0268663 A1 | 9/2021 | Gu et al. |
| 2021/0339326 A1 | 11/2021 | Simi et al. |
| 2021/0339327 A1 | 11/2021 | Simi et al. |
| 2021/0339328 A1 | 11/2021 | Simi et al. |
| 2021/0369374 A1 | 12/2021 | Simi et al. |
| 2021/0386495 A1 | 12/2021 | Simi et al. |
| 2021/0386496 A1 | 12/2021 | Simi et al. |
| 2021/0401522 A1 | 12/2021 | Mantri |
| 2022/0000540 A1 | 1/2022 | Grover |
| 2022/0022983 A1 | 1/2022 | Arnold et al. |
| 2022/0071718 A1 | 3/2022 | Fukuno |
| 2022/0079808 A1 | 3/2022 | Gliner et al. |
| 2022/0104892 A1 | 4/2022 | Hufford et al. |
| 2022/0249183 A1 | 8/2022 | Charles |
| 2022/0378613 A1 | 12/2022 | Glozman et al. |
| 2023/0070830 A1 | 3/2023 | Simi |
| 2023/0099522 A1 | 3/2023 | Moller |
| 2023/0142530 A1 | 5/2023 | Hipsley et al. |
| 2023/0190399 A1 | 6/2023 | Spuhler et al. |
| 2023/0226685 A1 | 7/2023 | Gil |

FOREIGN PATENT DOCUMENTS

| | | |
|---|---|---|
| DE | 4012882 A1 | 10/1991 |
| EP | 3370198 A1 | 9/2018 |
| EP | 3470040 | 3/2022 |
| EP | 3658057 B1 | 8/2023 |
| FR | 3109717 A1 | 11/2021 |
| GB | 2605812 A | 10/2022 |
| JP | 2019530517 A | 10/2019 |
| KR | 101400447 B1 | 5/2014 |
| WO | 2009097539 A2 | 8/2009 |
| WO | 2009120945 A1 | 10/2009 |
| WO | 2009120948 A2 | 10/2009 |
| WO | 2011088400 A2 | 7/2011 |
| WO | 2011100657 A1 | 8/2011 |
| WO | 2013090598 A1 | 6/2013 |
| WO | 2013101269 A1 | 7/2013 |
| WO | 2014004114 A1 | 1/2014 |
| WO | 2014197889 A1 | 12/2014 |
| WO | 2014201165 A1 | 12/2014 |
| WO | 2015010189 A1 | 1/2015 |
| WO | 2016054256 A1 | 4/2016 |
| WO | 2017015738 | 2/2017 |
| WO | 2017044965 A1 | 3/2017 |
| WO | 2017064306 A1 | 4/2017 |
| WO | 2017134077 A1 | 8/2017 |
| WO | 2017179044 A1 | 10/2017 |
| WO | 2017214243 A1 | 12/2017 |
| WO | 2018020251 A1 | 2/2018 |
| WO | 2018142397 A1 | 8/2018 |
| WO | 2018153512 A1 | 8/2018 |
| WO | 2018157078 A1 | 8/2018 |
| WO | 2018167246 | 9/2018 |
| WO | 2019183106 A1 | 9/2019 |
| WO | 2019183236 A1 | 9/2019 |
| WO | 2019209967 A1 | 10/2019 |
| WO | 2019212018 A1 | 11/2019 |
| WO | 2019222228 A1 | 11/2019 |
| WO | 2020048511 | 3/2020 |
| WO | 2020070501 A1 | 4/2020 |
| WO | 2020084611 A1 | 4/2020 |
| WO | 2020084625 A1 | 4/2020 |
| WO | 2020099192 A1 | 5/2020 |
| WO | 2020141487 A2 | 7/2020 |
| WO | 2020154012 A1 | 7/2020 |
| WO | 2021105703 A1 | 6/2021 |
| WO | 2021105992 A1 | 6/2021 |
| WO | 2021105993 A1 | 6/2021 |
| WO | 2021140513 A1 | 7/2021 |
| WO | 2021178961 A1 | 9/2021 |
| WO | 2021213751 A1 | 10/2021 |
| WO | 2021213851 A1 | 10/2021 |
| WO | 2021214750 A1 | 10/2021 |
| WO | 2021214751 A1 | 10/2021 |
| WO | 2021214754 A1 | 10/2021 |
| WO | 2021219311 A1 | 11/2021 |
| WO | 2021258007 A1 | 12/2021 |
| WO | 2022023962 A2 | 2/2022 |
| WO | 2022034488 A1 | 2/2022 |
| WO | 2022233585 A1 | 11/2022 |
| WO | 2022254335 A1 | 12/2022 |
| WO | 2023062470 A1 | 4/2023 |
| WO | 2023100123 A1 | 6/2023 |
| WO | 2023100124 A1 | 6/2023 |
| WO | 2023100125 A1 | 6/2023 |
| WO | 2023100126 A1 | 6/2023 |
| WO | 2023205761 A2 | 10/2023 |
| WO | 2023209550 A1 | 11/2023 |
| WO | 2024074948 A1 | 4/2024 |
| WO | 2024097895 A1 | 5/2024 |
| WO | 2024127205 A1 | 6/2024 |
| WO | 2024148299 A1 | 7/2024 |
| WO | 2024148316 A2 | 7/2024 |
| WO | 2024148331 A2 | 7/2024 |
| WO | 2024148334 A2 | 7/2024 |
| WO | 2024176143 A1 | 8/2024 |
| WO | 2024201236 | 10/2024 |
| WO | 2024231879 A1 | 11/2024 |

OTHER PUBLICATIONS

International Search Report and Written Opinion from International Application No. PCT/IB2023/054217 mailed Sep. 25, 2023.
Invitation to Pay Additional Fees for International Application No. PCT/IB2023/054217 mailed Aug. 2, 2023.
Non-Final Office Action for U.S. Appl. No. 17/818,477 mailed Dec. 5, 2024.
Communication Pursuant to Article 94(3) EPC for European Application No. 21749334.5 mailed Jun. 2, 2023.
Communication Pursuant to Article 94(3) EPC for European Application No. 21749334.5 mailed Jun. 23, 2023.
Final Office Action for U.S. Appl. No. 17/818,477 mailed Jul. 6, 2023.
International Search Report and Written Opinion from International Application No. PCT/IB2022/061633 mailed Apr. 6, 2023.
International Search Report and Written Opinion from International Application No. PCT/IB2022/061635 mailed Apr. 14, 2023.
International Search Report and Written Opinion from International Application No. PCT/IB2022/061635 mailed Jul. 3, 2023.
Invitation to Pay Additional Fees for International Application No. PCT/IB2022/061633 mailed Feb. 15, 2023.
Invitation to Pay Additional Fees for International Application No. PCT/IB2022/061635 mailed Feb. 22, 2023.
Final Office Action for U.S. Appl. No. 17/818,477 mailed Jul. 9, 2024.
International Search Report and Written Opinion from International Application No. PCT/IB2023/059694 mailed Dec. 22, 2023.
International Search Report and Written Opinion from International Application No. PCT/IB2023/062467 mailed May 2, 2024.
Invitation to Pay Additional Fees for International Application No. PCT/IB2023/062467 mailed Mar. 5, 2024.
U.S. Appl. No. 18/714,024, filed May 28, 2024.
U.S. Appl. No. 18/714,027, filed May 28, 2024.
U.S. Appl. No. 63/285,147, filed Dec. 2, 2021.
Communication Pursuant to Article 94(3) EPC for European Patent Application No. 21749334.5 mailed Dec. 14, 2022.
Examination Report for European Application No. 21749334.5 mailed Dec. 14, 2022.
International Search Report and Written Opinion from International Application No. PCT/IB2021/056784 mailed Feb. 14, 2022.
International Search Report and Written Opinion from International Application No. PCT/IB2021/057353 mailed Jan. 13, 2022.
International Search Report and Written Opinion from International Application No. PCT/IB2021/057353 mailed May 3, 2022.
International Search Report and Written Opinion from International Application No. PCT/IB2022/055086 mailed Nov. 22, 2022.
International Search Report and Written Opinion from International Application No. PCT/IB2022/059386 mailed Jan. 3, 2023.

(56) References Cited

OTHER PUBLICATIONS

International Search Report and Written Opinion from International Application No. PCT/IB2022/061634 mailed Feb. 15, 2023.
International Search Report and Written Opinion from International Application No. PCT/IB2022/061636 mailed Feb. 24, 2023.
Invitation to Pay Additional Fees for International Application No. PCT/IB2021/056784 mailed Oct. 27, 2021.
Invitation to Pay Additional Fees for International Application No. PCT/IB2021/057353 mailed Nov. 22, 2021.
Invitation to Pay Additional Fees for International Application No. PCT/IB2022/055086 mailed Sep. 1, 2022.
Non-Final Office Action for U.S. Appl. No. 17/818,477 mailed Mar. 2, 2023.
U.S. Appl. No. 17/818,477, filed Aug. 9, 2022.
U.S. Appl. No. 18/004,907, filed Jan. 10, 2023.
U.S. Appl. No. 18/095,267, filed Jan. 10, 2023.
U.S. Appl. No. 18/095,630, filed Jan. 11, 2023.
U.S. Appl. No. 18/125,489, filed Mar. 23, 2023.
U.S. Appl. No. 18/125,922, filed Mar. 24, 2023.
U.S. Appl. No. 18/298,490, filed Apr. 11, 2023.
U.S. Appl. No. 63/057,391, filed Jul. 28, 2020.
U.S. Appl. No. 63/065,068, filed Aug. 13, 2020.
U.S. Appl. No. 63/087,408, filed Oct. 5, 2020.
U.S. Appl. No. 63/195,429, filed Jun. 1, 2021.
U.S. Appl. No. 63/229,593, filed Aug. 5, 2021.
U.S. Appl. No. 63/256,587, filed Oct. 17, 2021.
U.S. Appl. No. 63/285,185, filed Dec. 2, 2021.
U.S. Appl. No. 63/285,218, filed Dec. 2, 2021.
U.S. Appl. No. 63/406,881, filed Sep. 15, 2022.
Boctor, et al., "Virtual Remote Center of Motion control for needle placement robots", Computer Aided Surgery; 9(5), 2004, pp. 175-183.
Chen, et al., "Semiautomated optical coherence tomography-guided robotic surgery for porcine lens removal", Laboratory Science: Robotic Surgery for Lens Extraction in an Animal Model, vol. 45 Issue 11, pp. 1665-1669, Nov. 2019.
Emeagwali, et al., "Performance Analysis of Steady-Hand Teleoperation versus Cooperative Manipulation", Research Gate, Conference Paper, Mar. 2004, pp. 1-7.
Mitchell, et al., "Development and Application of a New Steady-Hand Manipulator for Retinal Surgery", Proceedings 2007 IEEE International Conference on Robotics and Automation, pp. 623-629, 2007.
Wilson, et al., "Intraocular robotic interventional surgical system (IRISS): Mechanical design, evaluation, and master-slave manipulation", The International Journal of Medical Robotics and Computer Assisted Surgery,, pp. 1-12, 2018.
Gerber et al., "Advanced robotic surgical systems in ophthalmology". Eye (2020) 34:1554-1562. Last accessed Jul. 17, 2025.
Gonenc et al., "Design of 3-DOF Force Sensing Micro-Forceps for Robot Assisted Vitroetinal Surgery". Conf Proc IEEE End Med Biol Soc. 2013: 2013: 5686-5689. Last accessed Jul. 17, 2025.
Lee et al., "Design of Joint Motor for an Articulated Robot Considering Joint Load Characteristics". Energies 2021, 14(2)), 6690. Published Oct. 15, 2021. Last accessed Jul. 17, 2025.

Meenink, "Vitreo-retinal eye surgery robot: sustainable precision". PhD Thesis 1 (Research TUlei Graduation TU/e), Mechanical Engineering. Technische Universiteit Eindhoven. Jan. 1, 2011. (http://doi.org/10.6100/IR717725). Last accessed Jul. 17, 2025.
Mitros et al., "Optic Nerve Sheath Fenestration With a Multi-Arm Continuum Robot," in IEEE Robotics and Automation Letters, vol. 5, No. 3, pp. 4874-4881, Jul. 2020. (Last accessed Jul. 17, 2025) (26 pages, as attached).
Rozum Robotics, "Flow to Select the Best Motor for a Jointed Arm Robot" Robotics Tomorrow, published online Oct. 21, 2021 (9 pages total) (https://www.roboticstomorrow.com/article/2021/10/how-to-select-the-best-motor-for-a-jointed-arm-robot/17618). Last accessed Jul. 18, 2025.
Zhou et al., "Eye Explorer: A robotic endoscope holder for eye surgery". Inti J Medical Robotics and Computer Assisted Surgery. vol. 17(1). Feb. 2021, pp. 1-13. doi.org/10.1002/rcs.2177. Published Sep. 29, 2020. (https://onlinelibrary.wiley.com/doi/full/10.1002/rcs.2177) Last accessed Jul. 17, 2025.
Examination Report for European Application No. 22823628.7 mailed May 22, 2025.
Notice of Allowance for U.S. Appl. No. 18/126,095 mailed Jun. 3, 2025.
Restriction Requirement for U.S. Appl. No. 18/125,489 mailed May 19, 2025.
Restriction Requirement for U.S. Appl. No. 18/298,490 mailed Apr. 9, 2025.
Restriction Requirement for U.S. Appl. No. 18/299,190 mailed Jul. 29, 2025.
U.S. Appl. No. 19/137,403, filed Jun. 10, 2025.
Extended European Search Report for European Application No. 24163523.4 mailed Jun. 27, 2024.
Final Office Action for U.S. Appl. No. 17/818,477 mailed Mar. 26, 2025.
International Search Report and Written Opinion from International Application No. PCT/IB2024/051675 mailed Jul. 15, 2024.
International Search Report and Written Opinion from International Application No. PCT/IB2024/052760 mailed Aug. 20, 2024.
International Search Report and Written Opinion from International Application No. PCT/IB2024/054525 mailed Sep. 16, 2024.
Invitation to Pay Additional Fees for International Application No. PCT/IB2024/051675 mailed May 23, 2024.
Invitation to Pay Additional Fees for International Application No. PCT/IB2024/052760 mailed Jun. 28, 2024.
Invitation to Pay Additional Fees for International Application No. PCT/IB2024/054525 mailed Jul. 25, 2024.
Non-Final Office Action for U.S. Appl. No. 17/818,477 mailed Dec. 2, 2024.
Non-Final Office Action for U.S. Appl. No. 18/004,907 mailed Mar. 5, 2025.
U.S. Appl. No. 18/822,932, filed Sep. 3, 2024.
U.S. Appl. No. 18/825,382, filed Sep. 5, 2024.
U.S. Appl. No. 18/860,829, filed Oct. 28, 2024.
U.S. Appl. No. 19/097,061, filed Apr. 1, 2025.
U.S. Appl. No. 63/335,751, filed Apr. 28, 2022.
U.S. Appl. No. 63/412,475, filed Oct. 2, 2022.
U.S. Appl. No. 63/536,772, filed Sep. 6, 2023.
U.S. Appl. No. 63/537,053, filed Sep. 7, 2023.

* cited by examiner

ONE-SIDED ROBOTIC SURGICAL PROCEDURE

CROSS-REFERENCES TO RELATED APPLICATIONS

The present application is a continuation of PCT application PCT/IB2022/059386 to Vaknin, filed Oct. 2, 2022, entitled ""One-sided robotic surgical procedure", which claims priority from U.S. Provisional Patent Application No. 63/256,587 to Vaknin, filed Oct. 17, 2021, entitled "One-sided robotic surgical procedure", which is incorporated herein by reference.

FIELD OF EMBODIMENTS OF THE INVENTION

Some applications of the present invention generally relate to medical apparatus and methods. Specifically, some applications of the present invention relate to apparatus and methods for performing microsurgical procedures in a robotic manner.

BACKGROUND

Cataract surgery involves the removal of the natural lens of the eye that has developed an opacification (known as a cataract), and its replacement with an intraocular lens. Such surgery typically involves a number of standard steps, which are performed sequentially.

In an initial step, the patient's face around the eye is disinfected (typically, with iodine solution), and their face is covered by a sterile drape, such that only the eye is exposed. When the disinfection and draping has been completed, the eye is anesthetized, typically using a local anesthetic, which is administered in the form of liquid eye drops. The eyeball is then exposed, using an eyelid speculum that holds the upper and lower eyelids open. One or more incisions (and typically two or three incisions) are made in the cornea of the eye. The incision(s) are typically made using a specialized blade, that is called a keratome blade. At this stage, lidocaine is typically injected into the anterior chamber of the eye, in order to further anesthetize the eye. Following this step, a viscoelastic injection is applied via the corneal incision(s). The viscoelastic injection is performed in order to stabilize the anterior chamber and to help maintain eye pressure during the remainder of the procedure, and also in order to distance the anterior lens capsule from the cornea.

In a subsequent stage, known as capsulorhexis, a part of the anterior lens capsule is removed. Various enhanced techniques have been developed for performing capsulorhexis, such as laser-assisted capsulorhexis, zepto-rhexis (which utilizes precision nano-pulse technology), and marker-assisted capsulorhexis (in which the cornea is marked using a predefined marker, in order to indicate the desired size for the capsule opening).

Subsequently, it is common for a fluid wave to be injected via the corneal incision, in order to dissect the cataract's outer cortical layer, in a step known as hydrodissection. In a subsequent step, known as hydrodelineation, the outer softer epi-nucleus of the lens is separated from the inner firmer endo-nucleus by the injection of a fluid wave. In the next step, ultrasonic emulsification of the lens is performed, in a process known as phacoemulsification. The nucleus of the lens is broken initially using a chopper, following which the outer fragments of the lens are broken and removed, typically using an ultrasonic phacoemulsification probe. Further typically, a separate tool is used to perform suction during the phacoemulsification. When the phacoemulsification is complete, the remaining lens cortex (i.e., the outer layer of the lens) material is aspirated from the capsule. During the phacoemulsification and the aspiration, aspirated fluids are typically replaced with irrigation of a balanced salt solution, in order to maintain fluid pressure in the anterior chamber. In some cases, if deemed to be necessary, then the capsule is polished. Subsequently, the intraocular lens (IOL) is inserted into the capsule. The IOL is typically foldable and is inserted in a folded configuration, before unfolding inside the capsule. At this stage, the viscoelastic is removed, typically using the suction device that was previously used to aspirate fluids from the capsule. If necessary, the incision(s) is sealed by injecting balanced salt solution into the corneal stroma until diffuse whitening occurs, thereby causing the internal tissue to be pressed against the external tissue of the incision, such as to force closed the incision.

SUMMARY

In accordance with some applications of the present invention, apparatus and methods are provided that allow a surgeon to perform a procedure on a portion of a first side of patient's body, as if (s)he is performing the procedure on the same portion but on the opposite side of the patient's body. In this manner, if the surgeon has a preferred side of the body upon which to perform the procedure, even when (s)he is performing the procedure on the less-preferred side they can perform the procedure as if they were performing the procedure on their preferred side. For example, cataract surgery, as well as other ophthalmic surgeries, are typically performed upon both the patient's eyes (usually in two separate procedures). It follows that, when performing surgery on the patient's left eye, the surgeon's hands will be positioned differently with respect to the patient's face relative to when the surgeon is performing surgery on the patient's right eye. As most surgeons are not ambidextrous, surgeons report discomfort and reachability issues while positioning their dominant hand on the patient's nasal and/or medial frontal bones for stability. This discomfort occurs in cataract surgery where the surgeon sits superior to the patient's head, and the eye being operated on is in the opposed position to the surgeon's dominant hand. This is in contrast to when surgeons position their dominant hand on the patient's lateral frontal bone (bordering with the zygomatic arch bone), when performing surgery on the opposite eye. Thus, it is typically the case that right-handed surgeons have a preference for ophthalmic procedures that are performed on patients' left eye, whereas left-handed surgeons prefer to perform ophthalmic procedures on patients' right eyes.

For some applications, a robotic system includes one or more robotic units (which are configured to hold tools). Typically, the robotic system includes one or more control components (e.g., joysticks), each of which is configured to control actions of a respective one of the robotic units. Typically, when robotic system is used to perform surgery on the side of the body upon which the surgeon feels more comfortable operating, a display displays a non-mirrored image of the portion of the body to the surgeon and the surgeon uses each of the control components to control the respective corresponding robotic unit. Typically, when the robotic system is used to perform surgery on the side of the body upon which the surgeon feels less comfortable operating, the display displays a mirror image of the portion of the body to the surgeon and the surgeon uses the each of the control components to control the respective mirror robotic unit with the inputs to the control components being mirrored by the robotic units.

For example, as described hereinabove, an ophthalmic surgeon who is right handed typically prefers to perform ophthalmic procedures on patients' left eyes. In such cases, in order to perform a procedure on the patient's left eye, the system will typically not utilize the mirror functionalities described herein, since the surgeon is comfortable performing the procedure without the image and the control components having the mirroring functionalities. However, when performing a procedure on the patient's right eye, the mirroring functionalities described herein are typically implemented, such that even when the surgeon performs surgery on the patient's right eye it is as if (s)he is performing the surgery on their left eye.

There is therefore provided, in accordance with some applications of the present invention, apparatus for performing a procedure on a portion of a first side of a body of a patient using one or more tools, the apparatus including:
- an imaging device configured to image the portion of the first side of the patient's body;
- a display configured to display a mirror image of the portion of the first side of the patient's body to an operator;
- one or more control components configured to be operated by the operator;
- one or more robotic units configured to hold the one or more tools, each of the one or more robotic units corresponding to a respective control component and mirroring a position of the corresponding control component; and
- at least one computer processor configured to process inputs into the each of the control components such as to generate mirrored outputs at the corresponding robotic unit.

In some applications, the display is configured to display a mirror image of the portion of the first side of the patient's body to the operator, such that the mirror image appears to the operator as if it is the opposite side of the patient's body to the first side of the patient's body.

In some applications, the operator is configured to move the control components with respect to the mirror image, such that it is as if the operator is virtually operating on the opposite side of the patient's body to the first side of the patient's body.

In some applications, the one or more control components include one or more joysticks.

In some applications, the one or more joysticks are configured to hold virtual tools that corresponds to the one or more tools.

In some applications, the computer processor is configured to cause a tip of the one of the one or more tools to move such that it mirrors movement of a tip of a corresponding one of the one or more virtual tools.

In some applications:
- the one or more control components include a first control component configured to be operated by a left hand of the operator and a second control component configured to be operated by a right hand of the operator; and
- the one or more robotic units include a first robotic unit configured to hold a first one of the one or more tools, and a second robotic unit being configured to hold a second one of the one or more tools, the first robotic unit corresponding to the first control component and mirroring a position of the first control component, and the second robotic unit corresponding to the second control component and mirroring a position of the second control component.

In some applications, the first and second control components are configured to be placed at locations with respect to the mirror image of the portion of the first side of the patient's body that corresponds to locations of the first and second robotic units with respect to the portion of the first side of the patient's body.

In some applications, the first robotic unit is configured to hold the first tool with respect to the portion of the first side of the patient's body at a location that is disposed to the right of a location at which the second robotic unit is configured to hold the first tool with respect to the portion of the second side of the patient's body, when viewed in a direction facing the first side of the patient's body from a location on the first side of the patient's body, and the computer processor is configured to process inputs into the first control component such as to generate a mirrored output at the first robotic unit, and to process inputs into the second control component such as to generate a mirrored output at the second robotic unit.

In some applications, the apparatus is configured for use with an eye on a first side of the patient's body, the imaging device is configured to image the eye on the first side of the patient's body and the display is configured to display a mirror image of the eye on the first side of the patient's body, such that the mirror image appears to the operator as if it is the opposite eye to the eye on the first side of the patient's body.

In some applications, the operator is configured to move the control components with respect to the mirror image, such that it is as if the operator is virtually operating on the opposite eye to the eye on the first side of the patient's body.

In some applications, the first and second control components are configured to be placed at locations with respect to the mirror image of the eye of the first side of the patient's body that corresponds to locations of the first and second robotic units with respect to the eye of the first side of the patient's body.

In some applications, the first robotic unit is configured to hold the first tool with respect to the eye of the first side of the patient's body at a location that is disposed to the right of a location at which the second robotic unit is configured to hold the second tool with respect to the eye of the first side of the patient's body, when viewed in a direction facing the eye on the first side of the patient's body from a location on the first side of the patient's body, and the computer processor is configured to process inputs into the first control component such as to generate a mirrored output at the first robotic unit, and to process inputs into the second control component such as to generate a mirrored output at the second robotic unit.

There is further provided, in accordance with some applications of the present invention, a method for performing a procedure on a portion of a first side of a body of a patient using one or more tools that are held by one or more robotic units, the method including:
- driving an imaging device to image the portion of the first side of the patient's body;
- driving a display to display a mirror image of the portion of the first side of the patient's body to an operator;
- using a computer processor:
  - receiving inputs via one or more control components configured to be operated by the operator, each of the one or more robotic units corresponds to a respective control component and mirrors a position of the corresponding control component; and processing the inputs into the each of the control components such as to generate mirrored outputs at the corresponding robotic unit.

In some applications, driving the display to display a mirror image of the portion of the first side of the patient's body to the operator includes driving the display to display a mirror image of the portion of the first side of the patient's body to the operator, such that the mirror image appears to the operator as if it is the opposite side of the patient's body to the first side of the patient's body.

In some applications, receiving inputs via one or more control components configured to be operated by the operator includes allowing the operator to move the control components with respect to the mirror image, such that it is as if the operator is virtually operating on the opposite side of the patient's body to the first side of the patient's body.

In some applications, receiving inputs via one or more control components configured to be operated by the operator includes receiving inputs via one or more joysticks configured to be operated by the operator.

In some applications, receiving inputs via the one or more joysticks configured to be operated by the operator includes receiving inputs via one or more joysticks that are configured to hold virtual tools that corresponds to the one or more tools.

In some applications, processing the inputs into the each of the control components such as to generate mirrored outputs at the corresponding robotic unit includes causing a tip of the one of the one or more tools to move such that it mirrors movement of a tip of a corresponding one of the one or more virtual tools.

In some applications:

a first robotic unit is configured to hold a first one of the one or more tools, and a second robotic unit is configured to hold a second one of the one or more tools;

receiving inputs via one or more control components configured to be operated by the operator includes receiving inputs via a first control component configured to be operated by a left hand of the operator and a second control component configured to be operated by a right hand of the operator; and processing the inputs into the each of the control components such as to generate mirrored outputs at the corresponding robotic unit includes moving the first robotic unit such as to mirror a position of the first control component, and moving the second robotic unit such as to correspond to mirror a position of the second control component.

In some applications, the first and second control components are configured to be placed at locations with respect to the mirror image of the portion of the first side of the patient's body that corresponds to locations of the first and second robotic units with respect to the portion of the first side of the patient's body.

In some applications, the first robotic unit is configured to hold the first tool with respect to the portion of the first side of the patient's body at a location that is disposed to the right of a location at which the second robotic unit is configured to hold the first tool with respect to the portion of the second side of the patient's body, when viewed in a direction facing the first side of the patient's body from a location on the first side of the patient's body, and processing the inputs into the each of the control components such as to generate mirrored outputs at the corresponding robotic unit includes processing inputs into the first control component such as to generate a mirrored output at the first robotic unit, and processing inputs into the second control component such as to generate a mirrored output at the second robotic unit.

In some applications:

the method is configured for use with an eye on a first side of the patient's body;

driving the imaging device to image the portion of the first side of the patient's body includes driving the imaging device to image the eye on the first side of the patient's body; and driving the display to display the mirror image of the portion of the first side of the patient's body to an operator includes driving the display to display a mirror image of the eye on the first side of the patient's body, such that the mirror image appears to the operator as if it is the opposite eye to the eye on the first side of the patient's body.

In some applications, receiving inputs via one or more control components configured to be operated by the operator includes allowing the operator to move the control components with respect to the mirror image, such that it is as if the operator is virtually operating on the opposite eye to the eye on the first side of the patient's body.

In some applications, the first and second control components are configured to be placed at locations with respect to the mirror image of the eye of the first side of the patient's body that corresponds to locations of the first and second robotic units with respect to the eye of the first side of the patient's body.

In some applications, the first robotic unit is configured to hold the first tool with respect to the eye of the first side of the patient's body at a location that is disposed to the right of a location at which the second robotic unit is configured to hold the second tool with respect to the eye of the first side of the patient's body, when viewed in a direction facing the eye on the first side of the patient's body from a location on the first side of the patient's body, and processing the inputs into the each of the control components such as to generate mirrored outputs at the corresponding robotic unit includes processing inputs into the first control component such as to generate a mirrored output at the first robotic unit, and processing inputs into the second control component such as to generate a mirrored output at the second robotic unit.

The present invention will be more fully understood from the following detailed description of applications thereof, taken together with the drawings, in which:

DETAILED DESCRIPTION OF EMBODIMENTS

Figure 1:
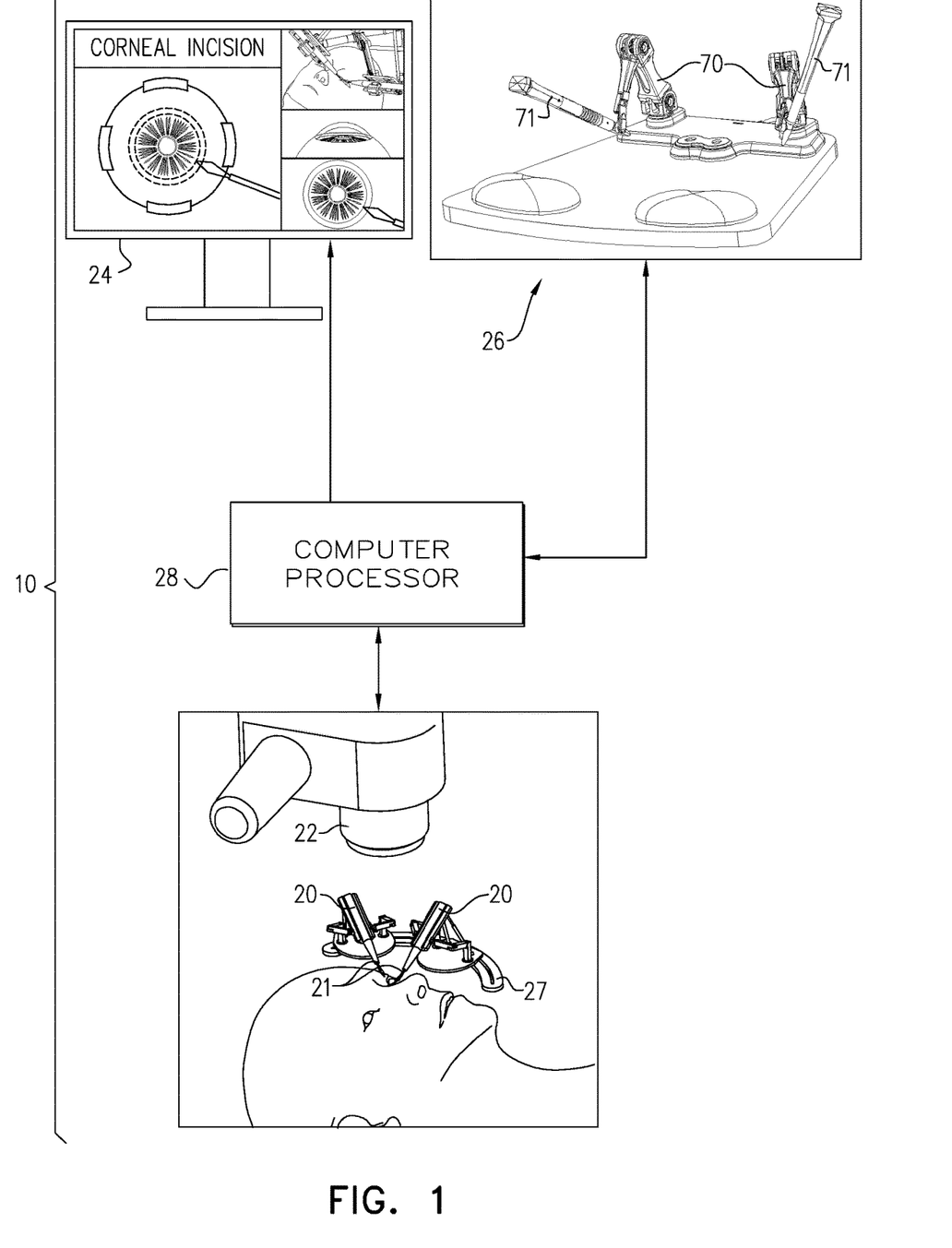
FIG. 1 is a schematic illustration of a robotic system that is configured for use in a microsurgical procedure, such as intraocular surgery, in accordance with some applications of the present invention.

Reference is now made to FIG. 1, which is a schematic illustration of a robotic system 10 that is configured for use in a microsurgical procedure, such as intraocular surgery, in accordance with some applications of the present invention.

Typically, when used for intraocular surgery, robotic system 10 includes one or more robotic units 20 (which are configured to hold tools 21), in addition to an imaging system 22, a display 24 and a control component unit 26 (e.g., a pair of control components, such as joysticks, as shown), via which a user (e.g., a healthcare professional) is able to control robotic units 20. Typically, robotic system 10 includes one or more computer processors 28, via which components of the system and a user (e.g., a healthcare professional) operatively interact with each other. For some applications, each of the robotic units is supported on a base 27, as shown. The scope of the present application includes mounting one or more robotic units in any of a variety of different positions with respect to each other.

Typically, movement of the robotic units (and/or control of other aspects of the robotic system) is at least partially controlled by a user (e.g., a healthcare professional). For example, the user may receive images of the patient's eye and the robotic units, and/or tools disposed therein, via display 24. Typically, such images are acquired by imaging system 22. For some applications, imaging system 22 is a stereoscopic imaging device and display 24 is a stereoscopic display. Based on the received images, the user typically performs steps of the procedure. For some applications, the user provides commands to the robotic units via control component unit 26. Typically, such commands include commands that control the position and/or orientation of tools that are disposed within the robotic units, and/or commands that control actions that are performed by the tools. For example, the commands may control a blade, a phacoemulsification tool (e.g., the operation mode and/or suction power of the phacoemulsification tool), and/or injector tools (e.g., which fluid (e.g., viscoelastic fluid, saline, etc.) should be injected, and/or at what flow rate). Alternatively or additionally, the user may input commands that control the imaging system (e.g., the zoom, focus, and/or x-y positioning of the imaging system). For some applications, the commands include controlling an IOL-manipulator tool, for example, such that the tool manipulates the IOL inside the eye for precise positioning of the IOL within the eye.

Typically, control component unit 26 includes one or more control components 70, e.g., joysticks that are configured to correspond to respective robotic units 20 of the robotic system. For example, as shown, the system may include first and second robotic units, and the control component unit may include first and second control components, e.g., joysticks, as shown. Typically, each of the joysticks is a control-component arm that includes a plurality of links that are coupled to each other via joints. For some applications, the control-component joysticks are configured to hold respective control-component tools 71 therein (in order to replicate the arms of the robotic units), as shown in FIG. 1A. Typically, the computer processor determines the XYZ location and orientation of the tip of the control-component tool 71, and drives the robotic unit such that the tip of the actual tool that is being used to perform the procedure tracks the movements of the tip of the control-component tool. As described in further detail hereinbelow, in some cases, the movement of the tip of the actual tool that is used to perform the procedure is made to mirror the movements of the tip of the control-component tool.

Figure 2:
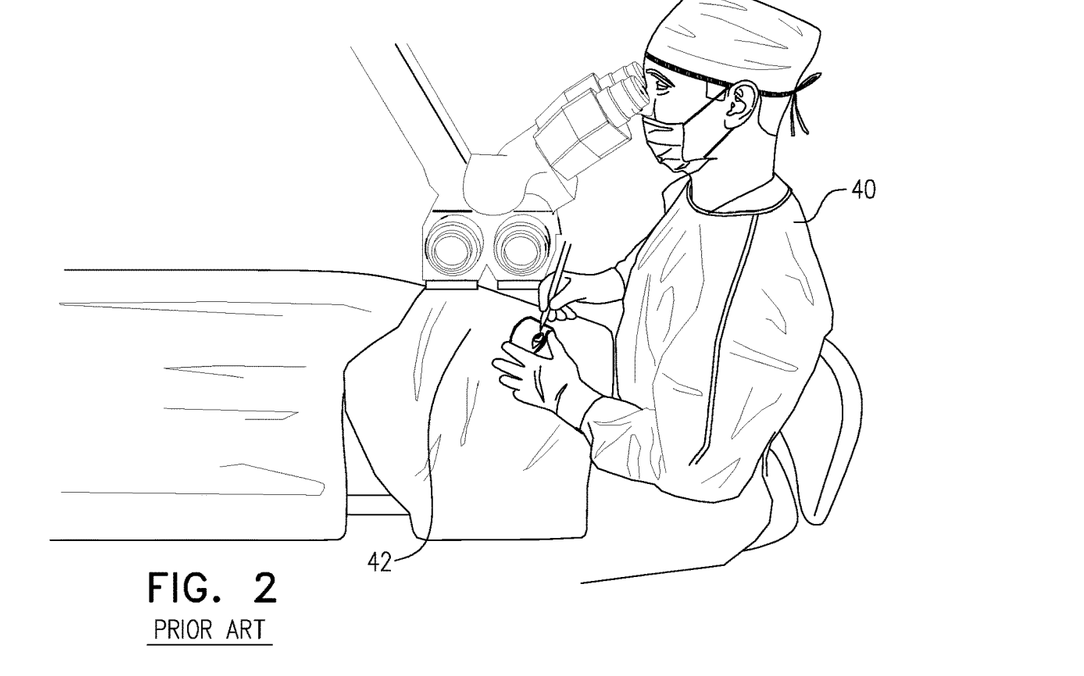
FIG. 2 is a schematic illustration of a surgeon performing ophthalmic surgery on a patient in a traditional manner (i.e., using non-robotic surgery), in accordance with prior art techniques.

Reference is also made to FIG. 2, which is a schematic illustration of a surgeon 40 performing ophthalmic surgery on a patient 42 in a traditional manner (i.e., using non-robotic surgery), in accordance with prior art techniques. Cataract surgery, as well as other ophthalmic surgeries, are typically performed upon both the patient's eyes (usually in two separate procedures). Further typically, when performing such surgery in a traditional manner (i.e., using non-robotic surgery), various stages of the procedure are performed by the surgeon operating two tools simultaneously, with each tool being manipulated using a respective hand. It follows that, when performing surgery on the patient's left eye, the surgeon's hands will be positioned differently with respect to the patient's face relative to when the surgeon is performing surgery on the patient's right eye. As most surgeons are not ambidextrous, surgeons report discomfort and reachability issues while positioning their dominant hand on the patient's nasal and/or medial frontal bones for stability. This discomfort occurs in cataract surgery where the surgeon sits superior to the patient's head, and the eye being operated on is in the opposed position to the surgeon's dominant hand. This is in contrast to when surgeons position their dominant hand on the patient's lateral frontal bone (bordering with the zygomatic arch bone), when performing surgery on the opposite eye. Thus, it is typically the case that right-handed surgeons have a preference for ophthalmic procedures that are performed on patients' left eye, whereas left-handed surgeons prefer to perform ophthalmic procedures on patients' right eyes. It is noted that the above-described discomfort may even extend to when surgeons perform microsurgical procedures in which they do not actually rest position their hands on patients' faces. This may result from surgeons "learning" to prefer performing a procedure on one side of patients' faces or the other, due to their acquired experiences of the above-mentioned issues of discomfort and reachability.

Referring again to FIG. 1, for some applications, robotic system 10 includes first and second robotic units 20 (which are configured to hold tools 21). Typically, each of the robotic units is configured to perform actions that are performed by a respective one of the surgeon's hands. Further typically, the robotic system includes control component unit 26, which typically includes a pair of control components 70, e.g. joysticks, with each of the control components typically being configured to control actions of a respective one of the robotic units. Typically, each of the joysticks is a control-component arm that includes a plurality of links that are coupled to each other via joints. Typically, when robotic system is used to perform surgery on the eye upon which the surgeon feels more comfortable operating, display 24 displays a non-mirrored image of the eye to the surgeon and the surgeon uses each of the control components to control the respective corresponding robotic arm. For some applications of the present invention, when the robotic system is used to perform surgery on the eye upon which the surgeon feels less comfortable operating, display 24 displays a mirror image of the eye to the surgeon and the surgeon uses the each of the control components to control the respective mirror robotic unit with the inputs to the control components being mirrored by the robotic units. It is noted that this is possible because (a) the eye is an asymmetric organ, (b) display 24 is configured to display a mirror image of the patient's eye, and (c) computer processor 28 is configured to process inputs into the control components such as to generate mirrored outputs at the robotic units.

Figure 3A:
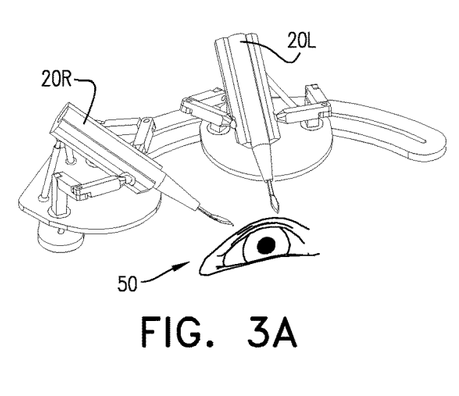
FIGS. 3A and 3B are respectively an original image and a mirror image of an eye of a subject, in accordance with some applications of the present invention.
Figure 3B:
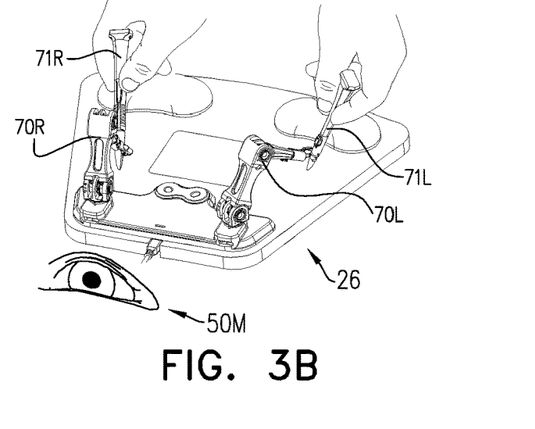

Referring now to FIGS. 3A and 3B, an example of the above-described procedure is provided. FIG. 3A is a non-mirror image 50 of a patient's right eye. FIG. 3B shows a mirror image 50M of the right eye (which appears similar to a left eye). The example that is provided illustrates a case in which a surgeon (or another operator of robotic system 10) prefers to perform a procedure on patients' left eyes, which is typically the case for a surgeon who is right handed. In such cases, in order to perform a procedure on the patient's left eye, the system will typically not utilize the mirror functionalities described herein, since the surgeon is comfortable performing the procedure without the image and the control components having the mirroring functionalities. However, when performing a procedure on the patient's right eye (shown in FIG. 3A), the mirroring functionalities described herein are typically implemented, such that even when the surgeon performs surgery on the patient's right eye it is as if (s)he is performing the surgery on their left eye.

Still referring to FIGS. 3A and 3B, in the above-described scenario, in order to perform a procedure on the patient's right eye, display 24 is configured to display mirror image 50M of the right eye to the surgeon, such that the surgeon sees what appears to be a left eye (as shown in FIG. 3B). The surgeon then positions and manipulates control components of 70 control component unit 26 (e.g., joysticks) as if (s)he was performing surgery on the patient's left eye, while robotic units 20 are positioned in corresponding, mirror positions with respect to the patient's right eye. When the surgeon moves and/or provides another input to one of the control components, the computer processor is configured to direct the input to the corresponding, mirror robotic unit 20 and to process the input such as to generate a mirrored output at the robotic unit. Thus, when the surgeon manipulates a control component 70L that is controlled by her/his left hand (e.g., a left joystick), it generates a mirrored output at the robotic unit that is positioned with respect to the patient's right eye at a position that is such that its movement would normally be controlled by a surgeons' right hand (denoted by 20R). Similarly, when the surgeon manipulates a control component 70R that is controlled by her/his right hand (e.g., a right joystick), it generates a mirrored output at the robotic unit that is positioned with respect to the patient's right eye at a position that is such that its movement would normally be controlled by a surgeons' left hand (denoted by 20L). In this manner, the surgeon is able to operate on both of the patient's eyes, while artificially viewing only her/his preferred eye and manipulating the control components as if to operate on his/her preferred eye.

It is noted that although some applications of the invention are described with reference to a robotic system that includes two robotic units and a control component unit that includes two control components (e.g., joysticks), which correspond to respective robotic units, the scope of the present invention includes a robotic system that includes any number of robotic units and a corresponding number of control components (e.g., joysticks or an alternative type of control components). For example, some applications of the present invention are applicable to a robotic system that includes a single robotic unit and a control component unit that includes a single control component (e.g., joystick or an alternative type of control component). Alternatively, some applications of the present invention are applicable to a robotic system that includes more than two robotic units and a control component unit that includes a corresponding number of control components (e.g., joysticks or an alternative type of control components).

Although some applications of the present invention are described with reference to cataract surgery, the scope of the present application includes applying the apparatus and methods described herein to other medical procedures, mutatis mutandis. In particular, the apparatus and methods described herein to other medical procedures may be applied to other microsurgical procedures, such as general surgery, orthopedic surgery, gynecological surgery, otolaryngology, neurosurgery, oral and maxillofacial surgery, plastic surgery, podiatric surgery, vascular surgery, and/or pediatric surgery that is performed using microsurgical techniques. For some such applications, the imaging system includes one or more microscopic imaging units.

It is noted that the scope of the present application includes applying the apparatus and methods described herein to intraocular procedures, other than cataract surgery, mutatis mutandis. Such procedures may include collagen crosslinking, endothelial keratoplasty (e.g., DSEK, DMEK, and/or PDEK), DSO (descemets stripping without transplantation), laser assisted keratoplasty, keratoplasty, LASIK/PRK, SMILE, pterygium, ocular surface cancer treatment, secondary IOL placement (sutured, transconjunctival, etc.), iris repair, IOL reposition, IOL exchange, superficial keratectomy, Minimally Invasive Glaucoma Surgery (MIGS), limbal stem cell transplantation, astigmatic keratotomy, Limbal Relaxing Incisions (LRI), amniotic membrane transplantation (AMT), glaucoma surgery (e.g., trabs, tubes, minimally invasive glaucoma surgery), automated lamellar keratoplasty (ALK), anterior vitrectomy, and/or pars plana anterior vitrectomy.

Applications of the invention described herein can take the form of a computer program product accessible from a computer-usable or computer-readable medium (e.g., a non-transitory computer-readable medium) providing program code for use by or in connection with a computer or any instruction execution system, such as computer processor 28. For the purpose of this description, a computer-usable or computer readable medium can be any apparatus that can comprise, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Typically, the computer-usable or computer readable medium is a non-transitory computer-usable or computer readable medium.

Examples of a computer-readable medium include a semiconductor or solid-state memory, magnetic tape, a removable computer diskette, a random-access memory (RAM), a read-only memory (ROM), a rigid magnetic disk and an optical disk. Current examples of optical disks include compact disk-read only memory (CD-ROM), compact disk-read/write (CD-R/W), DVD, and a USB drive.

A data processing system suitable for storing and/or executing program code will include at least one processor (e.g., computer processor 28) coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution. The system can read the inventive instructions on the program storage devices and follow these instructions to execute the methodology of the embodiments of the invention.

Network adapters may be coupled to the processor to enable the processor to become coupled to other processors or remote printers or storage devices through intervening private or public networks. Modems, cable modem and Ethernet cards are just a few of the currently available types of network adapters.

Computer program code for carrying out operations of the present invention may be written in any combination of one or more programming languages, including an object-oriented programming language such as Java, Smalltalk, C++ or the like and conventional procedural programming languages, such as the C programming language or similar programming languages.

It will be understood that the algorithms described herein, can be implemented by computer program instructions. These computer program instructions may be provided to a processor of a general-purpose computer, special purpose computer, or other programmable data processing apparatus to produce a machine, such that the instructions, which execute via the processor of the computer (e.g., computer processor 28) or other programmable data processing apparatus, create means for implementing the functions/acts specified in the algorithms described in the present application. These computer program instructions may also be stored in a computer-readable medium (e.g., a non-transitory computer-readable medium) that can direct a computer or other programmable data processing apparatus to function in a particular manner, such that the instructions stored in the computer-readable medium produce an article of manufacture including instruction means which implement the function/act specified in the algorithms. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the algorithms described in the present application.

Computer processor 28 is typically a hardware device programmed with computer program instructions to produce a special purpose computer. For example, when programmed to perform the algorithms described with reference to the Figures, computer processor 28 typically acts as a special purpose robotic-system computer processor. Typically, the operations described herein that are performed by computer processor 28 transform the physical state of a memory, which is a real physical article, to have a different magnetic polarity, electrical charge, or the like depending on the technology of the memory that is used. For some applications, operations that are described as being performed by a computer processor are performed by a plurality of computer processors in combination with each other.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus for performing a procedure on an eye on a first side of a body of a patient using one or more ophthalmic tools, the apparatus comprising:
   an imaging device configured to image the eye on the first side of the patient's body;
   a display configured to display a mirror image of the eye the first side of the patient's body to an operator, such that the mirror image appears to the operator as if it is the opposite eye to the eye on the first side of the patient's body;
   one or more control components configured to be operated by the operator moving the control components with respect to the mirror image, such that it is as if the operator is virtually operating on the opposite eye to the eye on the first side of the patient's body;
   one or more robotic units configured to hold the one or more ophthalmic tools, each of the one or more robotic units corresponding to a respective control component and mirroring a position of the corresponding control component; and
   at least one computer processor configured to process inputs into the each of the control components such as to generate mirrored outputs at the corresponding robotic unit.

2. The apparatus according to claim 1, wherein the one or more control components comprise one or more joysticks.

3. The apparatus according to claim 2, wherein the one or more joysticks are configured to hold virtual tools that corresponds to the one or more ophthalmic tools.

4. The apparatus according to claim 3, wherein the computer processor is configured to cause a tip of the one of the one or more ophthalmic tools to move such that it mirrors movement of a tip of a corresponding one of the one or more virtual tools.

5. The apparatus according to claim 1, wherein:
   the one or more control components comprise a first control component configured to be operated by a left hand of the operator and a second control component configured to be operated by a right hand of the operator; and
   the one or more robotic units comprise a first robotic unit configured to hold a first one of the one or more ophthalmic tools, and a second robotic unit being configured to hold a second one of the one or more ophthalmic tools, the first robotic unit corresponding to the first control component and mirroring a position of the first control component, and the second robotic unit corresponding to the second control component and mirroring a position of the second control component.

6. The apparatus according to claim 5, wherein the first and second control components are configured to be placed at locations with respect to the mirror image of the eye on the first side of the patient's body that corresponds to locations of the first and second robotic units with respect to the eye on the first side of the patient's body.

7. The apparatus according to claim 6, wherein the first robotic unit is configured to hold the first tool with respect to the eye on the first side of the patient's body at a location that is disposed to the right of a location at which the second robotic unit is configured to hold the first tool with respect to the eye on the second side of the patient's body, when viewed in a direction facing the first side of the patient's body from a location on the first side of the patient's body, and wherein the computer processor is configured to process inputs into the first control component such as to generate a mirrored output at the first robotic unit, and to process inputs into the second control component such as to generate a mirrored output at the second robotic unit.

8. The apparatus according to claim 1, wherein the first and second control components are configured to be placed at locations with respect to the mirror image of the eye on the first side of the patient's body that corresponds to locations of the first and second robotic units with respect to the eye on the first side of the patient's body.

9. The apparatus according to claim 8, wherein the first robotic unit is configured to hold the first tool with respect to the eye on the first side of the patient's body at a location that is disposed to the right of a location at which the second robotic unit is configured to hold the second tool with respect to the eye of the first side of the patient's body, when viewed in a direction facing the eye on the first side of the patient's body from a location on the first side of the patient's body, and wherein the computer processor is configured to process inputs into the first control component such as to generate a mirrored output at the first robotic unit, and to process inputs into the second control component such as to generate a mirrored output at the second robotic unit.

10. A method for performing a procedure on a eye on a first side of a body of a patient using one or more ophthalmic tools that are held by one or more robotic units, the method comprising:
- driving an imaging device to image the eye on the first side of the patient's body;
- driving a display to display a mirror image of the eye on the first side of the patient's body to an operator, such that the mirror image appears to the operator as if it is the opposite eye to the eye on the first side of the patient's body;
- using a computer processor:
  - receiving inputs via one or more control components configured to be operated by the operator moving the control components with respect to the mirror image, such that it is as if the operator is virtually operating on the opposite eye to the eye on the first side of the patient's body, wherein each of the one or more robotic units corresponds to a respective control component and mirrors a position of the corresponding control component; and
  - processing the inputs into the each of the control components such as to generate mirrored outputs at the corresponding robotic unit.

11. The method according to claim 10, wherein receiving inputs via one or more control components configured to be operated by the operator comprises receiving inputs via one or more joysticks configured to be operated by the operator.

12. The method according to claim 11, wherein receiving inputs via the one or more joysticks configured to be operated by the operator comprises receiving inputs via one or more joysticks that are configured to hold virtual tools that corresponds to the one or more ophthalmic tools.

13. The method according to claim 12, wherein processing the inputs into the each of the control components such as to generate mirrored outputs at the corresponding robotic unit comprises causing a tip of the one of the one or more ophthalmic tools to move such that it mirrors movement of a tip of a corresponding one of the one or more virtual tools.

14. The method according to claim 10, wherein:
- a first robotic unit is configured to hold a first one of the one or more ophthalmic tools, and a second robotic unit is configured to hold a second one of the one or more ophthalmic tools;
- receiving inputs via one or more control components configured to be operated by the operator comprises receiving inputs via a first control component configured to be operated by a left hand of the operator and a second control component configured to be operated by a right hand of the operator; and
- processing the inputs into the each of the control components such as to generate mirrored outputs at the corresponding robotic unit comprises moving the first robotic unit such as to mirror a position of the first control component, and moving the second robotic unit such as to correspond to mirror a position of the second control component.

15. The method according to claim 14, wherein the first and second control components are configured to be placed at locations with respect to the mirror image of the eye on the first side of the patient's body that corresponds to locations of the first and second robotic units with respect to the eye on the first side of the patient's body.

16. The method according to claim 15, wherein the first robotic unit is configured to hold the first tool with respect to the eye on the first side of the patient's body at a location that is disposed to the right of a location at which the second robotic unit is configured to hold the first tool with respect to the eye on the second side of the patient's body, when viewed in a direction facing the first side of the patient's body from a location on the first side of the patient's body, and wherein processing the inputs into the each of the control components such as to generate mirrored outputs at the corresponding robotic unit comprises processing inputs into the first control component such as to generate a mirrored output at the first robotic unit, and processing inputs into the second control component such as to generate a mirrored output at the second robotic unit.

17. The method according to claim 15, wherein the first robotic unit is configured to hold the first tool with respect to the eye on the first side of the patient's body at a location that is disposed to the right of a location at which the second robotic unit is configured to hold the second tool with respect to the eye on the first side of the patient's body, when viewed in a direction facing the eye on the first side of the patient's body from a location on the first side of the patient's body, and wherein processing the inputs into the each of the control components such as to generate mirrored outputs at the corresponding robotic unit comprises processing inputs into the first control component such as to generate a mirrored output at the first robotic unit, and processing inputs into the second control component such as to generate a mirrored output at the second robotic unit.

* * * * *